United States Patent
Hawighorst et al.

(10) Patent No.: US 10,301,045 B2
(45) Date of Patent: May 28, 2019

(54) PACKING ARRANGEMENT AND METHOD FOR PACKING A PRODUCT

(71) Applicant: Windmoeller & Hoelscher KG, Lengerich (DE)

(72) Inventors: Thomas Hawighorst, Hasbergen (DE); Martin Hohenbrink, Hagen a.T.W. (DE); Daniel Narberhaus, Lengerich (DE)

(73) Assignee: WINDMOELLER & HOELSCHER KG, Lengerich (DE)

( * ) Notice: Subject to any disclaimer, the term of this patent is extended or adjusted under 35 U.S.C. 154(b) by 350 days.

(21) Appl. No.: 15/182,999

(22) Filed: Jun. 15, 2016

(65) Prior Publication Data

US 2016/0362204 A1 Dec. 15, 2016

(30) Foreign Application Priority Data

Jun. 15, 2015 (DE) .................. 10 2015 210 973

(51) Int. Cl.
| | | |
|---|---|---|
| *B65B 1/04* | (2006.01) | |
| *B65B 35/50* | (2006.01) | |
| *B65B 43/46* | (2006.01) | |
| *H04W 4/80* | (2018.01) | |
| *B65B 9/13* | (2006.01) | |
| *H04W 84/12* | (2009.01) | |
| *B65G 57/00* | (2006.01) | |

(52) U.S. Cl.
CPC .............. *B65B 1/04* (2013.01); *B65B 9/135* (2013.01); *B65B 35/50* (2013.01); *B65B 43/465* (2013.01); *H04W 4/80* (2018.02); *B65G 57/00* (2013.01); *H04W 84/12* (2013.01)

(58) Field of Classification Search
CPC ......... B65B 1/04; B65B 35/50; B65B 43/465; B65B 9/135; B65B 1/30; B65B 1/32; B65B 1/36; B65B 1/40; B65B 35/52; H04W 4/80; H04W 84/12; H04W 4/60; H04W 84/14; B65G 57/00
See application file for complete search history.

(56) References Cited

U.S. PATENT DOCUMENTS

| | | | |
|---|---|---|---|
| 6,691,491 B2* | 2/2004 | Terminella | B65B 9/20 53/133.4 |
| 2016/0096273 A1* | 4/2016 | Burns | B25J 9/1687 700/259 |

FOREIGN PATENT DOCUMENTS

| | | |
|---|---|---|
| DE | 102005037916 | 5/2006 |
| DE | 102008033549 | 2/2009 |
| DE | 202013011509 | 3/2014 |
| WO | WO 2013/018074 | 2/2013 |

* cited by examiner

*Primary Examiner* — David J Walczak
(74) *Attorney, Agent, or Firm* — Jacobson Holman, PLLC

(57) ABSTRACT

A packaging unit for packaging a product includes at least one of a bagging unit, a pallet loading device, and a pallet securing device. Also included is a device to provide information regarding the packaging unit, the packaging, and/or the product, allowing the information to be displayed with at least one terminal outside the device.

9 Claims, 2 Drawing Sheets

PACKING ARRANGEMENT AND METHOD FOR PACKING A PRODUCT

BACKGROUND OF THE INVENTION

1. Field of the Invention

The invention relates to a packing arrangement and a method for packing a product in a plurality of bags or sacks.

2. Description of Related Art

Frequently, larger quantities of a product which is particularly free flowing, pourable, or flowable are packed in such a packing arrangement in quantities that can be transported.

Such a packing arrangement is arranged over a larger area so that the operator can only oversee the entire equipment with difficulty. In particular, alarms may be overlooked. Additionally, the operation of the entire arrangement is time-consuming due to the spatial distances and thus difficult.

SUMMARY OF THE INVENTION

The objective of the present invention is therefore to further develop a packing arrangement and a method for packing a product in a plurality of bags or sacks such that it can be overseen more easily.

The objective is attained in the features of the invention described herein. The description illustrates additional embodiments of the packing arrangement according to the invention and the inventive method, with it being possible to use the features mentioned in the context with the packaging arrangement according to the invention also in connection with the inventive method and vice versa, so that here mutually the respective features can be referenced.

According to the invention the packing arrangement may comprise a bagging unit, in which the product, frequently stored in a silo, is bagged into individual bags or sacks. Such arrangements are called form fill seal machines, because from a tubular material individual bags are generated, open at the top, which are also filled with the product in said device, and are sealed at the upper, open end.

According to the invention, the packing arrangement may comprise a device for placing a plurality of bags or sacks filled with the product onto a pallet, with several generally successively supplied bags being combined and arranged in a layer. Several such layers are successively stacked on a pallet until a desired height is reached.

Such a packing arrangement according to the invention may comprise a load securing device for securing the pallets loaded with bags (pallet securing device), with, in general, the pallet loaded with bags being wrapped with a plastic coating (stretch hood), or with a film, particularly a stretch film. Such a secured pallet can now be transported, in general.

The invention now includes one of these devices or a combination thereof as desired.

According to the present invention a device is provided for rendering available information regarding the arrangement, the packing, and/or the product, allowing to display said information with a terminal outside the arrangement. This way it is possible for the user to gather information and have it displayed, even at a location from which the packing arrangement cannot be easily overseen or not at all.

This way the operator is enabled to always monitor the individual devices for example and perhaps render decisions at an early time, for example when an alarm occurs.

In another embodiment it is provided that the device for rendering information available comprises a data provider by which the information can be gathered, rendered available, and/or reformatted. Here the information may originate in at least one of the devices, particularly all of the devices. In the latter case the information, particularly information regarding each device itself and/or information regarding events of each device, can be provided jointly and be present in the same data format. The information may here originate in individual or common data memories. All of this information can be gathered by the data provider and transmitted to the terminal. In particular, this way information regarding the entire packing arrangement can be displayed using a terminal.

In another embodiment of the invention it is provided that the device for rendering information available comprises a device for the wireless transmission of said information. This way the information can be transmitted to the terminal in a particularly simple fashion.

Here it is advantageous if the device for the wireless transmission of said information comprises at least one WLAN access point, a Bluetooth transmitter, a 3G-transmitter, a LTE-transmitter, and/or a DECT-transmitter. For the wireless transmission here standards of prior art are used, which minimizes the programming expenses for such a transmission device and simultaneously renders it very reliable.

For the display of information here a mobile terminal is preferred as the device, which can be easily carried by the operator without a major strain. This includes particularly smart phones, tablets, notebooks, or similar devices. Alternatively, fixed installed terminals may be advantageous as well, such as a large monitor placed or suspended in the proximity of the packing arrangement. In this case, the operator can for example perform a task with both hands, such as the execution of maintenance tasks, without having to forego reading information.

In order to render the illustration of information as easy as possible, it is provided that this information can be made available in the form of a website. This way it is ensured that as many different terminals as possible can display the information without any adjustments of the terminals or the data provider being required. Frequently web browsers, thus the viewer of web sites, are integrated in terminals, which simplifies the illustration of information. It is also possible to have the information displayed by a terminal located outside the facility in which the packing arrangement is installed, conditional to the data provider being able to feed the information to the internet.

It is particularly advantageous if the device to render available information is embodied such that this information is provided in a data format independent from the platform. This refers to a data format which can be displayed by different hardware and/or software. This way, the information can be displayed using various operating systems and/or terminals of different manufacturers. Such a data format is the HTML-format, particularly the HTML-5 format.

In order to prevent any abuse of data it is provided to transmit the information in an encrypted form.

BRIEF DESCRIPTION OF THE DRAWINGS

Additional advantages, features, and details of the invention are discernible from the following description, in which various embodiments are described in detail with reference to the drawings. Here, the features mentioned in the claims and the description are each potentially relevant for the invention individually or in desired combinations of the features mentioned. Within the scope of the entire disclosure, features and details described in the context with the method according to the invention also apply in the context with the inventive packing arrangement and vice versa, so that with regards to the disclosure of the individual aspects of the invention always mutual reference is made or can be made. The individual FIGS. show:

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
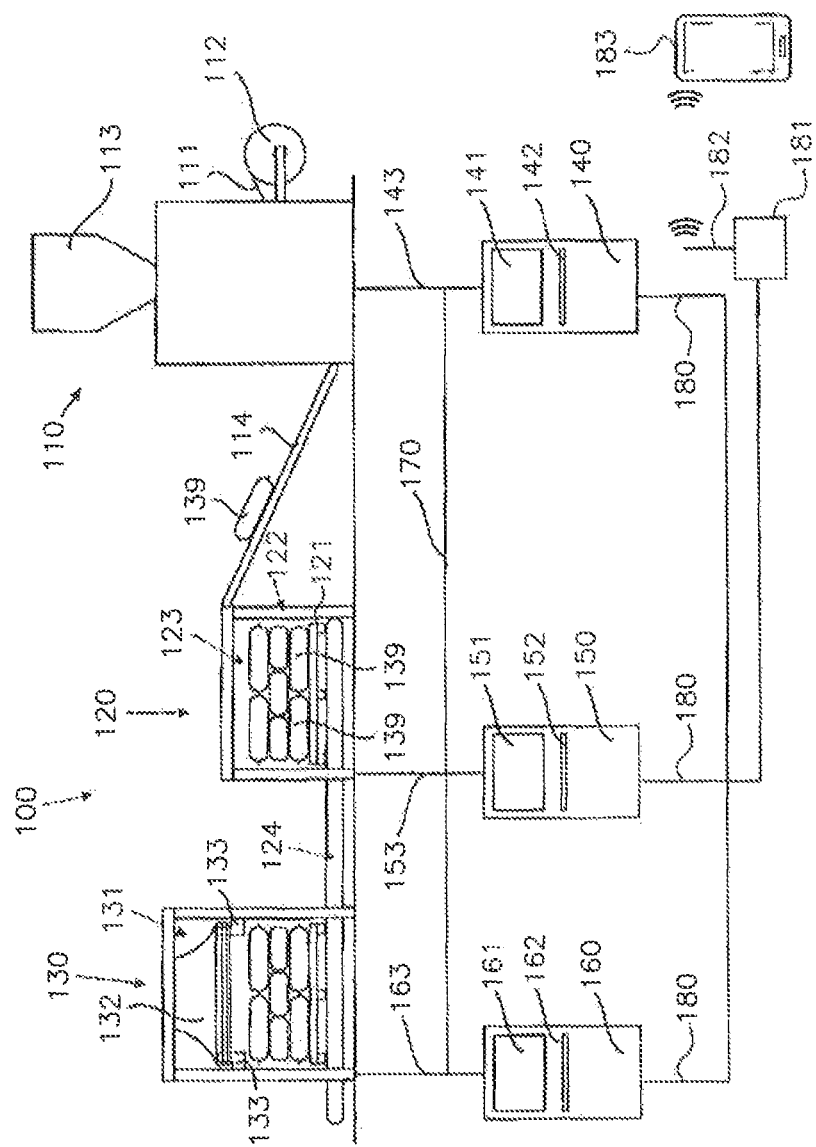
FIG. 1 schematic illustration of a packing arrangement according to the invention, FIG. 2 illustration of the function of a data filter of a packing arrangement according to the invention, FIG. 3 monitor display of a device of the packing arrangement according to the invention.

FIG. 1 shows a schematic illustration of a packing arrangement 100 according to the invention, (comprising) a bagging unit 130, a pallet loading device 120, and a load securing device 130. The bagging device 130 is supplied with a tubular packing means 113, which is stored on a roll 112. This packing means 113 is pulled off the roll 112. The front end of this packing means 111 is provided with a bottom seam and cut to a bag length such that a bag is formed, which is open towards the top. It is grasped at its upper end by a pair of graspers and transported to a filling station. Here, the upper end is pulled such that the inside of the bag becomes accessible. Now the bag can be filled with the product to be bagged, which is freely flowing, but represents a solid substance (thus is not a liquid) in the desired quantity, for example 25 kg. The product is here stored in a silo 113 and is taken therefrom. Subsequently the still open but already filled bag is moved to a sealing station, in which a head seam is applied, sealing the bag, generally by way of a welding process.

The filled bags 139 are now transported with a transport device 114, which may comprise several conveyer belts, to the pallet loading device 120. Here, several bags 139 are collected above a pallet 121 and arranged there. This arrangement of bags is placed onto the pallet and forms there a bag layer 122. In this bag layer the bags are generally arranged varying in reference to the previous bag layer, in order to this way increase the stability of the stack of bags 123.

The completely loaded pallet 121 is now moved by a conveyer device 124 to the load securing device 130, where the loaded pallet is provided with a cover, a so-called stretch hood 131. For this purpose respectively one gathering finger 133 is arranged at each corner, above the loaded pallet, on which a film hose 132 is stored showing a certain length. Subsequently the gathering fingers 133 move diagonally towards the outside, so that seen in the horizontal direction they are outside the dimensions of the pallet. Here the film hose 132 is stretched. Now the gathering fingers 133 can move downwards and here successively release the film hose so that a smooth hood develops over the loaded pallet. Before or during the downwards motion of the gathering fingers the film hose 132 is severed according to the length required and closed with a welding seam so that the hood 131 is closed at the top. The stretched hood serves not only to securely keep the bags on the pallet during transportation, but it can also serve for protection from environmental influences, such as moisture.

Each of the above-mentioned devices 110, 120, 130 comprise in this exemplary embodiment a control and information device 140, 150, 160, which saves and renders available respective information regarding events in the respective device. For this purpose, the storage device may comprise a computer and at least one bulk memory component, for example in the form of a hard drive, on a magnetic basis and/or a solid-state drive (semiconductor drive). In this storage component now information can he saved regarding various but specified events. Some of these events, for example "production of a filled bag or sack" occur continuously, while other events may occur irregularly. However, storage regarding the respective information occurs for all events.

The storage device 140, 150, 160 may respectively also comprise a monitor 141, 151, 161, on which illustrations can be displayed comprising the various information saved. Furthermore, an input device 142, 152, 162 may be provided, by which for example commands can be entered leading to the above-mentioned illustrations. Data conductors 143, 153, 163 lead from the various components of the devices to the storage device 140, 150, 160.

Furthermore, a data conductor 170 is shown, networking together the devices and also the control and information devices. This way it is possible to access from one of the control and information devices 140, 150, 160 all other control and information devices 140, 150, 160 and/or the devices 110, 120, 130.

From the control and information devices 140, 150, 160 additional data conductors 180 lead to a data provider 181, with its objective being to make information available to other devices. For this purpose the data provider 181 is communicating with the control and information devices 140, 150, 160 so that the data provider gathers the information, reformats it if necessary, and renders it available to at least one terminal. The data provider 181 can also be connected to one or two control and information devices 140, 150, 160 or integrated therein, whereby information from the other control and information devices can then be transmitted via the data conductor to the control and information device.

In the present exemplary embodiment the data provider 181 transmits via an antenna 182 the data wirelessly to a terminal, here a smartphone 183.

Figure 2:
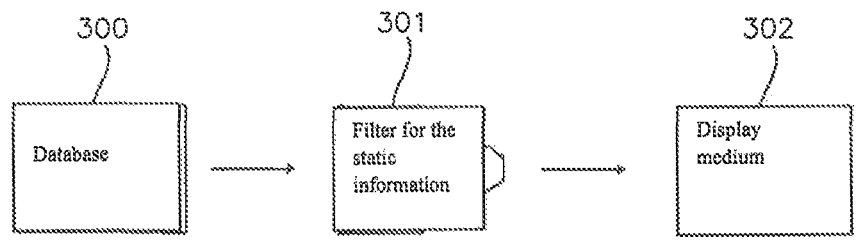

FIG. 2 shows an illustration of the function of a data filter of a packing arrangement according to the invention. Here a database is shown which provides a software connection of events and the corresponding information and organizes the storage in the storage components. Additionally, the database provides information also in case of inquiries.

In a special data inquiry now data can be obtained in the embodiment shown, with only search criteria and/or search ranges being permitted for the static information. For example the user, the recipe, the time, and the machine can he determined for data inquiry. For example, all information can be searched for allocated to events which occurred within the most recent 24 hours. A respective data inquiry in the dynamic information is not provided. The data inquiry is shown in FIG. 2 as filter 301. The data inquiry can then be disclosed to the user by a display medium 302, for example a monitor. The above-mentioned data inquiry can also be organized by the terminal. For this purpose, the data inquiry is transmitted from the terminal via the data provider initially to the control and information devices, in which advantageously the information is determined. It is then in turn transmitted via the data provider to the terminal for the purpose of displaying it.

Figure 3:
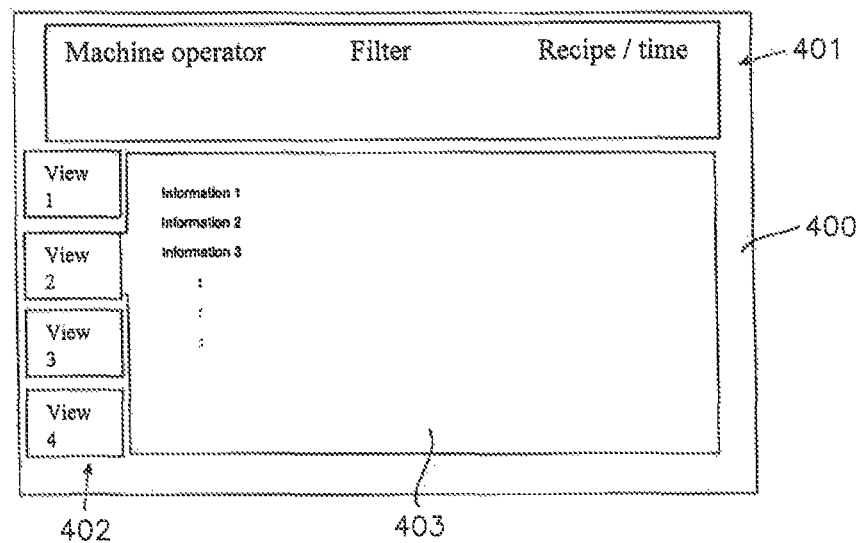

FIG. 3 shows an embodiment for an illustration of the results of a data inquiry on a monitor 400 of a one of the control or information systems or a terminal located outside the packing arrangement according to the invention. In a display range 401 the filter is shown, i.e., the lettering "filter" represents the filter name. Under this filter name the filter can be saved with the respective search criteria. Now, all events are displayed in the illustration range 402 or all events are shown that match the static information of the search criteria. The event used is shown in FIG. 3 as view 1, view 2, etc. A view can now be selected, in which all static and/or dynamic information regarding the selected event can be displayed. For this purpose, the illustration field 403 is provided.

The exemplary embodiment of FIG. 2 and FIG. 3 serves for the simple formation of a filter as well as the clear illustration of the search results. This can occur, as described above, by one of the control and information devices 140, 150, 160 for all devices. This way, an operator can quickly be informed about important matters of the packing arrangement, such as previous maintenance work performed.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

| List of reference characters | |
| --- | --- |
| 100 | Packing arrangement |
| 110 | Bagging device |
| 111 | Packing means |
| 112 | Roll |
| 113 | Silo |
| 114 | Transportation device |
| 120 | Pallet loading device |
| 121 | Pallet |
| 122 | Bag layer |
| 123 | Stack of bags |
| 124 | Conveyer device |
| 130 | Load securing device |
| 131 | Stretch hood |
| 132 | Film hose |
| 133 | Gathering fingers |
| 139 | Filled bags |
| 140, 150, 160 | Control and information device |
| 141, 151, 161 | Monitor |
| 142, 152, 162 | Input device |
| 170 | Data conductor |
| 180 | Data conductor |
| 181 | Data provider |
| 182 | Antenna |
| 183 | Smartphone |
| 301 | Filter |
| 302 | Display medium |
| 400 | Monitor |
| 401 | Illustration range |
| 402 | Illustration range |
| 403 | Illustration range |

What is claimed is:

1. A packaging unit for packaging a product, said packaging unit comprising:
a bagging device;
a pallet loading device; and
a pallet securing device, and
a device for providing information on the bagging device, the pallet loading device, and the pallet securing device, on the packaging, and/or on the product, the information being displayable with at least one terminal outside the bagging device, the pallet loading device, and the pallet securing device, with each of the bagging device, the pallet loading device, and the pallet securing device including an operating and information unit for providing information on events that is storable and that can be provided to the respective device,
with the device for providing information including a data provider with which the information can be collected, provided, and/or reformatted.

2. The packaging unit according to claim 1, wherein
the device for providing information includes a device for a wireless transmission of said information.

3. The packaging unit according to claim 2, wherein
the device for the wireless transmission of said information includes at least a WLAN access point, a Bluetooth transmitter, a 3G-transmitter, a LTE-transmitter, and/or a DECT-transmitter.

4. The packaging unit according to claim 1, wherein
the terminal is a mobile terminal.

5. The packaging unit according to claim 4, wherein the mobile terminal is a smartphone, a tablet, or a notebook.

6. The packaging unit according to claim 1, wherein
the device for providing information provides the information in the form of a website.

7. The packaging unit according to claim 1, wherein
the device for providing information is configured to provide the information in a platform-independent data format.

8. The packaging unit according to claim 1, wherein with the terminal
the information can be received as encrypted data.

9. A method of packaging a free-flowing product, said method comprising the steps of:
bagging the product in bags or sacks with a bagging device;
loading a plurality of the bags or sacks onto a pallet with a pallet loading device; and
securing the bags or sacks loaded on the pallet with a pallet securing device, and
with a device for providing information on the bagging device, the pallet loading device, and the pallet securing device, on the packaging, and/or the product, displaying the information with at least one terminal outside the bagging device, the pallet loading device, and the pallet securing device,
with an operating and information unit associated with each of the bagging device, the pallet loading device, and the pallet securing device, providing information on events that is storable and that can be provided to the respective device, and
with a data provider associated with the device for providing information, collecting, providing, and/or reformatting the information.

* * * * *